(12) United States Patent
Chen et al.

(10) Patent No.: US 8,056,012 B2
(45) Date of Patent: Nov. 8, 2011

(54) CONTENT AWARE WORKFLOW BUILDER AND WORKFLOW ENGINE

(75) Inventors: Ying-Pong Chen, San Jose, CA (US); Gregory Scott Johnston, Cary, NC (US); Wayne F. Miller, Cary, NC (US); Sharon McKenna Sanders, Los Gatos, CA (US); Alan Tsu-I Yaung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 11/013,001

(22) Filed: Dec. 15, 2004

(65) Prior Publication Data

US 2006/0129443 A1    Jun. 15, 2006

(51) Int. Cl.
*G06F 3/048* (2006.01)

(52) U.S. Cl. ........ 715/771; 750/751; 750/755; 750/762; 750/763

(58) Field of Classification Search .................... 715/771
See application file for complete search history.

(56) References Cited

U.S. PATENT DOCUMENTS

| | | | |
|---|---|---|---|
| 5,774,661 A * | 6/1998 | Chatterjee et al. | 709/203 |
| 6,430,538 B1 | 8/2002 | Bacon et al. | |
| 6,624,908 B1 | 9/2003 | Petchenkine et al. | |
| 6,697,784 B2 | 2/2004 | Bacon et al. | |
| 6,720,967 B1 * | 4/2004 | Cox et al. | 345/440 |
| 7,184,967 B1 * | 2/2007 | Mital et al. | 705/8 |
| 2003/0004770 A1 * | 1/2003 | Miller et al. | 705/8 |
| 2003/0005406 A1 * | 1/2003 | Lin et al. | 717/102 |
| 2003/0078975 A1 * | 4/2003 | Ouchi | 709/205 |
| 2003/0195885 A1 | 10/2003 | Emmick et al. | |
| 2003/0222906 A1 | 12/2003 | Fish et al. | |
| 2003/0233374 A1 | 12/2003 | Spinola et al. | |
| 2004/0117795 A1 | 6/2004 | Wang et al. | |
| 2005/0015711 A1 * | 1/2005 | Yamamoto et al. | 715/500 |
| 2006/0067252 A1 * | 3/2006 | John et al. | 370/261 |
| 2006/0080616 A1 * | 4/2006 | Vogel et al. | 715/769 |
| 2006/0111953 A1 * | 5/2006 | Setya | 705/8 |

* cited by examiner

*Primary Examiner* — Simon Ke
*Assistant Examiner* — Anil Kumar
(74) *Attorney, Agent, or Firm* — Hovey Williams LLP

(57) ABSTRACT

Devices, methods, and computer programs are disclosed for providing a graphical workflow programming environment for routing documents. First a workflow design platform is provided that comprises a process canvas for receiving at least one graphical workflow programming object. Next, a graphical representation of the graphical workflow programming object is provided where the graphical representation is adapted to be selected by an administrator of the graphical workflow programming environment and inserted into the process canvas, wherein the graphical workflow programming object comprises a graphical decision point that is adapted to route the documents based on contents of the documents.

6 Claims, 14 Drawing Sheets

```xml
<?xml version="1.0" standalone="yes" ?>
  <process>
    <processdata>
      <name>P_Straight_LineFVT</name>
      <version>CM 8.3 xml</version>
      <description />
      <documentation />
      <aclname>DocRouteACL</aclname>
      <processtimelimit>1</processtimelimit>
      <stickyToolBar>OFF</stickyToolBar>
      <autoLaunch>OFF</autoLaunch>
      <showToolBarIcon>OFF</showToolBarIcon>
      <showTable>OFF</showTable>
      <showOverView>OFF</showOverView>
      <keyboardDrawMode>OFF</keyboardDrawMode>
      <showIconText>OFF</showIconText>
      <showTextState>ON</showTextState>
      <iconSize>2</iconSize>
    </processdata>
    <invoke>
      <name>WN_1_FVT</name>
      <description />
      <documentation />
      <type>Work</type>
      <layoutxpos>106</layoutxpos>
      <layoutypos>160</layoutypos>
    </invoke>
    <invoke>
      <name>WN_2_FVT</name>
      <description />
      <documentation />
      <type>Work</type>
      <layoutxpos>206</layoutxpos>
      <layoutypos>160</layoutypos>
    </invoke>
    <invoke>
      <name>Stop</name>
      <description />
      <documentation />
      <type>Stop</type>
      <layoutxpos>306</layoutxpos>
      <layoutypos>160</layoutypos>
    </invoke>
    <invoke>
      <name>Start</name>
      <description />
      <documentation />
      <type>Begin</type>
      <layoutxpos>17</layoutxpos>
      <layoutypos>160</layoutypos>
    </invoke>
    <flow>
      <source>
        <linkname>WN_1_FVT</linkname>
```

FIG. 15A

```xml
        <routename>10</routename>
        <routetype>OPTIONS_BRANCH</routetype>
        <when>Continue</when>
        <lineoptions>
           <linecolor>java.awt.Color[r=0,g=0,b=255]</linecolor>
           <linewidth>2</linewidth>
           <linesegment1>5.0</linesegment1>
           <linegap1>1.0</linegap1>
           <linesegment2>5.0</linesegment2>
           <linegap2>1.0</linegap2>
     </lineoptions>
        <startxposition>122</startxposition>
        <startyposition>164</startyposition>
        <bendpoints>
           <layoutxpos>10</layoutxpos>
           <layoutypos>10</layoutypos>
           <layoutxpos>24</layoutxpos>
           <layoutypos>10</layoutypos>
           <layoutxpos>96</layoutxpos>
           <layoutypos>10</layoutypos>
           <layoutxpos>110</layoutxpos>
           <layoutypos>10</layoutypos>
        </bendpoints>
     </source>
       <target>
          <linkname>WN_2_FVT</linkname>
     </target>
  </flow>
  <flow>
     <source>
        <linkname>WN_2_FVT</linkname>
        <routename>10</routename>
        <routetype>OPTIONS_BRANCH</routetype>
        <when>Continue</when>
        <lineoptions>
           <linecolor>java.awt.Color[r=0,g=0,b=255]</linecolor>
           <linewidth>2</linewidth>
           <linesegment1>5.0</linesegment1>
           <linegap1>1.0</linegap1>
           <linesegment2>5.0</linesegment2>
           <linegap2>1.0</linegap2>
     </lineoptions>
        <startxposition>222</startxposition>
        <startyposition>164</startyposition>
        <bendpoints>
           <layoutxpos>10</layoutxpos>
           <layoutypos>10</layoutypos>
           <layoutxpos>24</layoutxpos>
           <layoutypos>10</layoutypos>
           <layoutxpos>87</layoutxpos>
           <layoutypos>10</layoutypos>
           <layoutxpos>101</layoutxpos>
           <layoutypos>10</layoutypos>
        </bendpoints>
```

FIG. 15B

```xml
      </source>
        <target>
          <linkname>Stop</linkname>
        </target>
    </flow>
      <flow>
        <source>
          <linkname>Start</linkname>
          <routename>10</routename>
          <routetype>DIRECTIONAL</routetype>
          <lineoptions>
            <linecolor>java.awt.Color[r=0,g=0,b=0]</linecolor>
            <linewidth>2</linewidth>
            <linesegment1>1.0</linesegment1>
            <linegap1>0.0</linegap1>
            <linesegment2>1.0</linesegment2>
            <linegap2>0.0</linegap2>
          </lineoptions>
          <startxposition>22</startxposition>
          <startyposition>164</startyposition>
        <bendpoints>
            <layoutxpos>10</layoutxpos>
            <layoutypos>10</layoutypos>
            <layoutxpos>24</layoutxpos>
            <layoutypos>10</layoutypos>
            <layoutxpos>89</layoutxpos>
            <layoutypos>10</layoutypos>
            <layoutxpos>94</layoutxpos>
            <layoutypos>10</layoutypos>
            <layoutxpos>108</layoutxpos>
            <layoutypos>10</layoutypos>
         </bendpoints>
       </source>
    <target>
        <linkname>WN_1_FVT</linkname>
    </target>
  </flow>
    </process>
```

FIG. 15C

CONTENT AWARE WORKFLOW BUILDER AND WORKFLOW ENGINE

FIELD

The present teachings relate to electronic document routing within a network or content management system, such as the system disclosed in U.S. patent application Ser. No. 10/319,575, entitled "Content Management System and Method of Employing Extensible Workflow Entities with User-Defined Attributes in an Object-Oriented Framework," filed Jun. 17, 2004, the disclosure of which is incorporated herein by reference in its entirety. More particularly the present teachings relate to content-aware workflow builders and methods for providing content-aware workflow builders.

BACKGROUND

Content management (CM) systems provide storage of and access to content, preferably in digital form (e.g., images, videos, audio, text, etc.). CM systems also provide indexing functions in order to store and retrieve information based on various attributes. Document routing is an important component to a CM system. Without document routing capabilities, the CM systems would merely become document archival systems. Document routing enables a document to be routed through various processing steps or phases in order to facilitate users performance of business or other types of process. For example, when a claim is submitted to an insurance company for an auto accident, finite stages or routings are required to obtain the necessary approvals for paying the insurance claim, depending on the type of claim or damage incurred. Document routing procedures should be capable of identifying various sequences of finite steps through which documents are routed in order to complete insurance claim processing, for example.

One means for defining document routing procedures is by defining a workflow, which represents operational aspects of a work procedure, i.e: how tasks are structured, who performs them, what their relative order is, how they are synchronized, how information flows to support the tasks and how tasks are being tracked. Workflow is an important concept in a content management system. Essentially, workflow encompasses two parts: defining a workflow, and executing a workflow based on the routing of particular documents.

IBM DB2 Content Manager V8.1 (i.e., CM V8.1) delivered in 2002 provides a limited workflow modeling capability through the use of the system administration client. However in this workflow builder as well as other known workflow builders, there are a number of deficiencies. Specifically, in known systems only a limited visual workflow builder is available. In known systems, for a user to design a document routing workflow that routes documents based on document attributes, a user defines a workflow process by interacting with a screen dialog in a table or grid format which is not intuitive from the perspective of usability and readability. Moreover, in known systems, content awareness is not well addressed. As used herein "content awareness" refers to integration within a graphical workflow model of actual contents, or document (or item) attributes, of routed documents into the graphical workflow.

By way of illustration, in known systems, a route in a graphical workflow process cannot be automatically determined consistent with a graphical workflow by evaluating an attribute value of a document or a folder. By way of a more particular example, it is not possible within the graphical workflow itself to model that the process will go to a specific route if the claim amount is greater than $500, for example.

Because known graphical workflow models are not capable of operating on content of routed documents, the known graphical workflow models cannot route documents based upon contents of the documents. Therefore, such content conditional routing must be performed at the application level, which required custom programming and divorced business practices from the workflow design and modeling process.

Accordingly, there is a need for a content-aware workflow builder that can graphically model content-aware collection and branching in a workflow and, therefore, route documents and implement business processes based on the contents of the documents without requiring custom application intervention in the workflow process.

SUMMARY

Various embodiments of the present invention solve the above-described problems and provide a distinct advance in the art of providing a content-aware graphical workflow builder in connection with a content management system.

The workflow modeling techniques disclosed in connection with the present teachings address the deficiencies of content management workflow modeling by providing a visual builder, content awareness, and a descriptive representation of content-aware workflow. Workflow builders consistent with the present teachings have a user-friendly graphical user interface. In various embodiments, the workflow builders are tightly integrated with the content manager system administration tool to facilitate the definition of workflow processes. While particular embodiments of the present teachings are described in connection with IBM DB2 content manager, the present teachings are applicable to workflow builders generally.

Accordingly, in various embodiments, there are a provided devices, methods, and computer programs for providing a graphical workflow programming environment for routing of documents. First, a workflow design platform is provided that comprises a process canvas for receiving at least one graphical workflow programming object. Next, a graphical representation of the graphical workflow programming object is provided where the graphical representation is adapted to be selected by an administrator of the graphical workflow programming environment and inserted into the process canvas. The graphical workflow programming object includes a graphical decision point that is adapted to route the documents based on contents of the documents.

In various embodiments, a method is provided for providing a graphical workflow programming environment for routing documents. A workflow design platform is provided that includes a process canvas for receiving at least one graphical workflow programming object. A graphical representation of the graphical workflow programming object is provided where the graphical representation adapted to be selected by an administrator of the graphical workflow programming environment and inserted into the process canvas, where the graphical workflow programming object includes at least one graphical collection point for describing the selective waiting for the arrival of documents of predetermined type and number to facilitate the resumption or continuation of the defined process.

In various embodiments, a computer program product involving a combination of code segments stored in a computer-readable memory and executable by at least one processor is provided in connection with a document routing server and a client computer to route documents according to a workflow process specified in connection with a graphical workflow programming environment. A code segment is provided that is operable to provide a workflow design platform comprising a process canvas for receiving a graphical workflow programming object. Further, a code segment is provided that is operable to provide at least one graphical representation of the graphical workflow programming object. The graphical representation is adapted to be selected by an administrator of the graphical workflow programming environment and inserted into the process canvas, where the graphical workflow programming object includes at least one graphical decision point that is adapted to route the documents based on contents of the documents. Additionally, a graphical collection point is provided for describing the selective waiting for the arrival of documents of predetermined type and number to facilitate the resumption or continuation of the defined process.

A document routing system is provided for routing documents based on a graphical workflow specified in a workflow programming environment. A workflow design platform is provided that comprises a process canvas for receiving a graphical workflow programming object. Further, a memory is provided that contains a graphical representation of the graphical workflow programming object, the graphical representation adapted to be selected by an administrator of the workflow programming environment and inserted into the process canvas. Further, the graphical workflow programming object includes at least one graphical decision point that is adapted to route the documents based on the contents of documents.

It is understood that both the foregoing general description and the following description of various embodiments are exemplary and explanatory only and are not restrictive of the invention as claimed. The accompanying drawings, which are incorporated in and constitute a part of this specification, illustrate various embodiments, and together with the description serve to explain the principles of the embodiments described herein.

BRIEF DESCRIPTION OF THE DRAWINGS

The skilled artisan will understand that the drawings, described below, are for illustration purposes only. The drawings are not intended to limit the scope of the present teachings in any way.

FIGS. 15A-15C illustrate an exemplary XML export corresponding to the simplified workflow model of FIG. 14.

DESCRIPTION OF VARIOUS EMBODIMENTS

Figure 1:
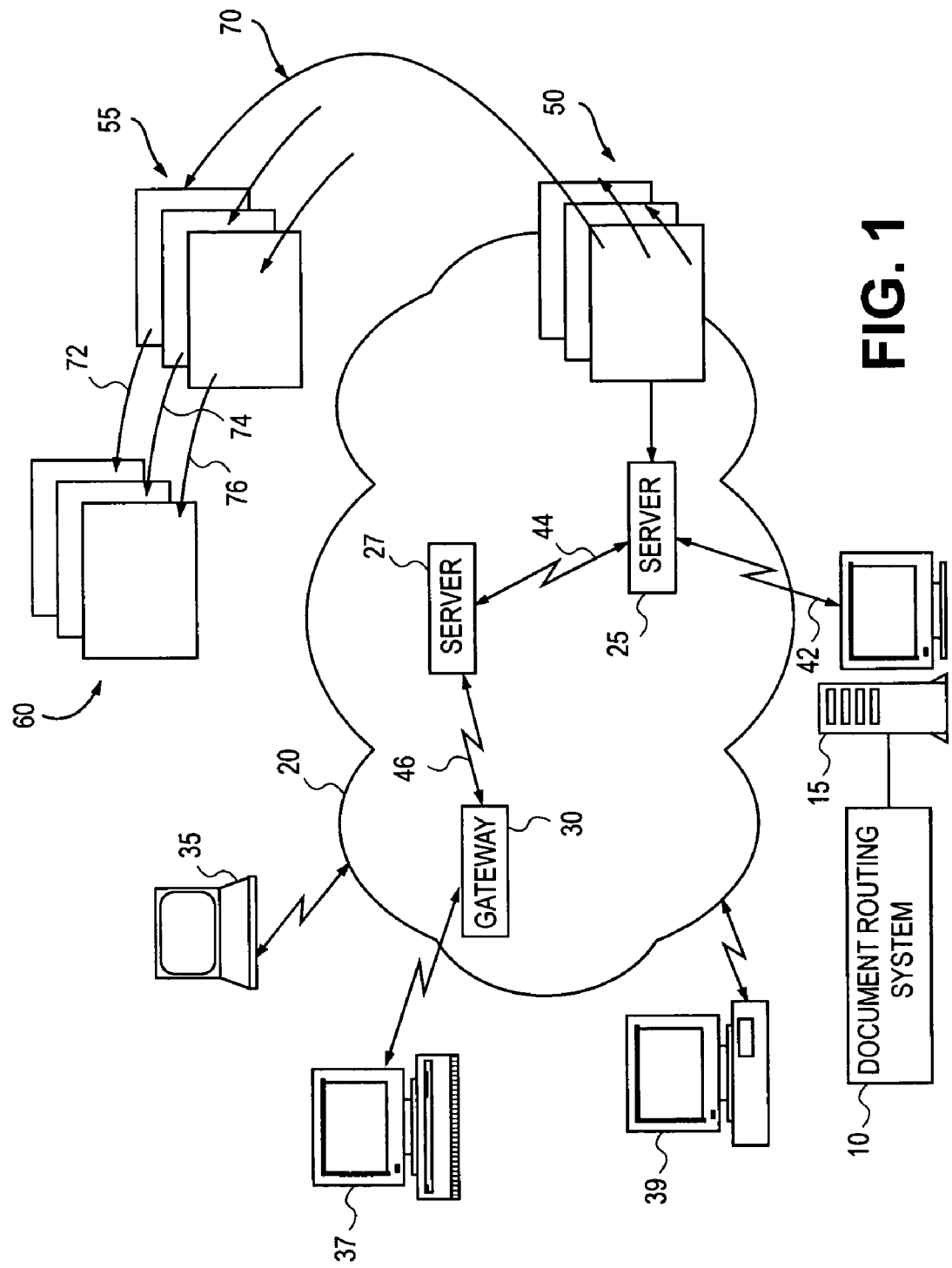
FIG. 1 is a schematic illustration of an exemplary system employing the present teachings with respect to a document routing system for a content management system.

Reference will now be made in detail to some embodiments, examples of which are illustrated in the accompanying drawings. Wherever possible, the same reference numbers are used throughout the drawings to refer to the same or like parts.

The term "process" as used herein refers to a series of steps defined by an administrator or user of the workflow builder tool, through which a document or documents are routed. Examples of "processes" include the exemplary claims process of FIG. 5A.

The term "node" or "work node" as used herein refers to a step within a process.

The term "collection point" as used herein refers to a special work node waiting for external documents to be collected in a folder.

The term "sequential routing" as used herein refers routing a document through a series of steps.

The term "branching" as used herein refers to how a document is routed to one of alternative branches in a process at runtime based on workflow definitions and content of documents.

The term "parallel routing" as used herein refers to routing of documents on multiple paths simultaneously or substantially simultaneously.

The term "decision point" as used herein refers to a step that contains decision criteria to determine the next route for a particular document or documents.

The term "business application node" as used herein refers to a step that allows the invocation of a business application, for example on the server that is hosting the document routing software.

The term "action" as used herein refers to a user defined operation, which may include execution of an executable program.

The term "action list" as used herein refers to named collection of actions.

The term "administrator" as used herein refers to users of the workflow builder who define work processes in document routing systems.

The terms "worker," "client user," or "client application user" as used herein refers to users of applications that utilize document routing systems consistent with the present teachings.

The term "folder" as used herein refers to an item that contains other items, e.g., a claim folder containing claim form, police report, estimate, etc.

The term "item" as used herein refers to a digital document, i.e. digitized content, e.g., a PDF file, a MPEG file, etc. In the present teachings, item and document are used interchangeably.

The term "item attribute" as used herein refers to metadata describing certain characteristics of an item, e.g., security clearance is an attribute of an intelligence analysis report.

The term "item type" as used herein refers to a classification (or grouping) of items that have common attributes, e.g., the automobile-claim-item-type has "claim amount" as a common attribute among automobile-claim items. Accordingly, items of the same item type share common attributes. Another example is "address item type," which has street, city, state, and zip code as attributes. In this example, Peter's address, Paul's address, and Mary's address share the same attributes, but (assuming they all live at different addresses) different values.

The term "item type ACL" as used herein refers to an access control list that is associated with items of various types. In various embodiments, the item type ACL is a default ACL that can be overridden on specific item or document instantiations.

The term "work node variable" as used herein refers to variables associated with a particular work node, whereby routing information is associated with a routed document. The appended routing information is conceptually analogous to information affixed to a routing slip associated with a physically routed document.

The term "work package properties" as used herein refers to properties of an overall workflow process, generally.

The term "graphical workflow programming object" as used herein refers to a graphical symbol or icon and information associated with the icon used to define a graphical workflow.

The term "process canvas" as used herein refers to a window or other graphical construct into which graphical workflow programming objects can be placed.

An exemplary system employing the present teachings with respect to a document routing system 10 to enable workflow entities to include user-defined attributes is illustrated in FIG. 1. Specifically, document routing system 10 typically forms part of a content management system and includes a software or computer program module that is typically embedded within or installed on a host server computer system 15. Alternatively, document routing system 10 may be stored on a suitable storage medium, such as a diskette, a CD, DVD, a hard drive, or like devices in the form of a computer program product. The document routing system may be utilized in connection with the Internet (e.g., a collection of interconnected public and private computer networks that are linked together with routers by a set of standard protocols to form a global, distributed network) or other network, or with a stand-alone database of documents or other text sources that may have been derived from the Internet and/or other sources. A document may be any item that can be electronically digitized, including audio, video, pictures, text, etc.

A communication network 20 includes communication lines and switches connecting server computer systems, such as servers 25, 27, to gateways, such as gateway 30. Servers 25, 27 and gateway 30 provide communication access to the Internet. Users, such as remote Internet users, are represented by a variety of computer systems, such as computer systems 35, 37, 39, and may query host server 15 for desired information. The host server is connected to network 20 via a communications link, such as a telephone, cable, or satellite link. Servers 25, 27 can be connected via high speed Internet network lines 44, 46 to other computer systems and gateways and provide access to stored information, such as hypertext or web documents indicated generally at 50, 55, and 60. Hypertext documents 50, 55, 60 typically include embedded hypertext links to other locally stored pages, and hypertext links 70, 72, 74, 76 to other web sites or documents 55, 60 that are stored by various web servers, such as server 27. The various server, user and gateway computer systems may be implemented by any conventional personal or other computer or processing system (e.g., IBM-compatible, lap top, Macintosh, etc.) including a base (e.g., with the processors, memory and communication devices, etc.) and optional display and input devices (e.g., mouse, etc.). The computer systems may employ any conventional or other platform or operating system (e.g., Windows, Unix, Linux, etc.) and typically include appropriate software for communications and/or document routing functions.

Figure 2:
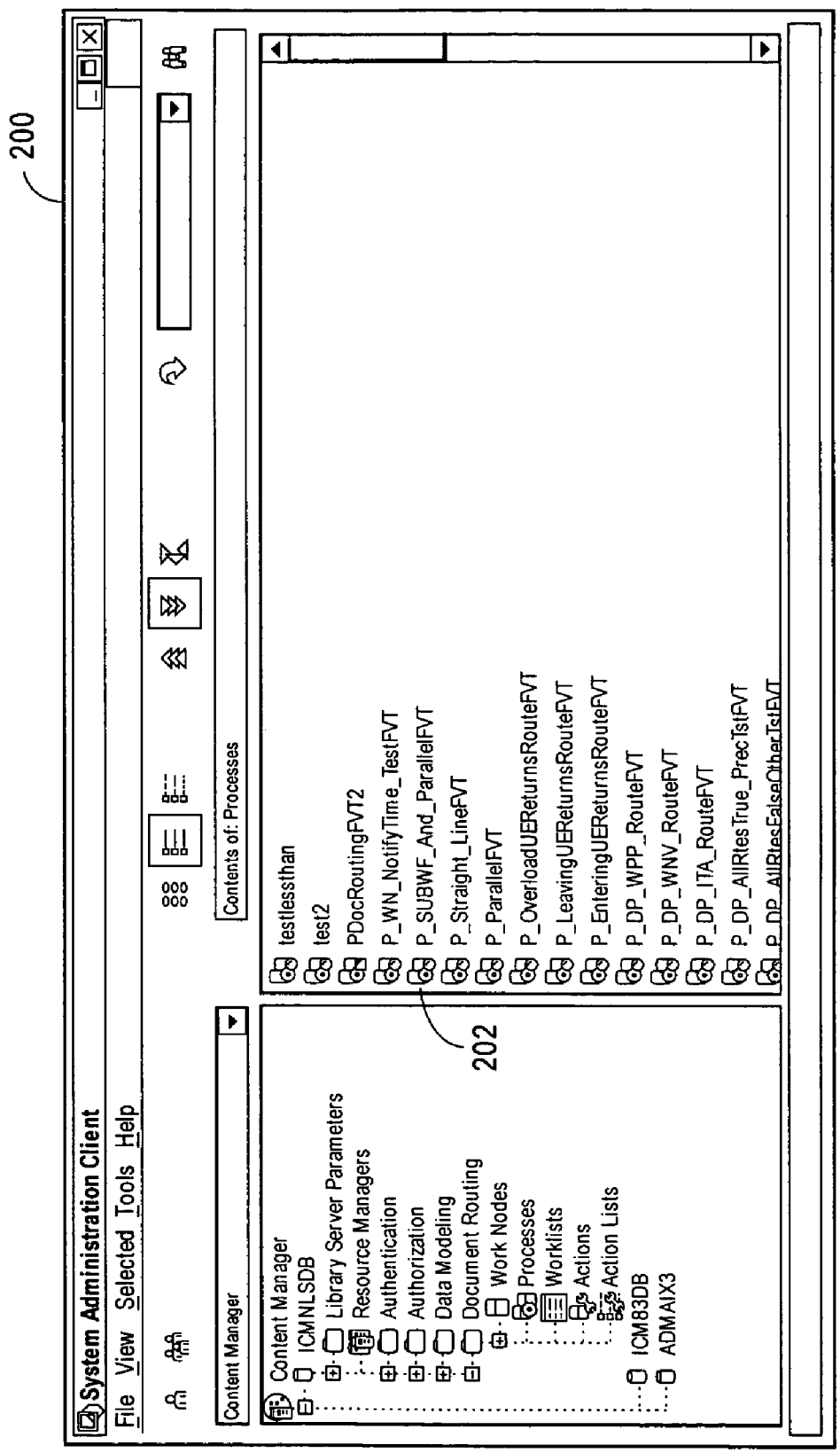
FIG. 2 is a block diagram illustrating a window implementing a system administration client of a content management system consistent with the present teachings.

Referring now to FIG. 2, window 200 is a block diagram illustrating a system administration client of a content manager consistent with the present teachings. Window 200 represents how, consistent with the present teachings, a content manager system administration tool presents a workflow builder for specifying document routing. The icons 202 presented in the right panel of canvas or window 200 represent a collection of workflow processes defined in the graphical workflow builder.

Figure 3:
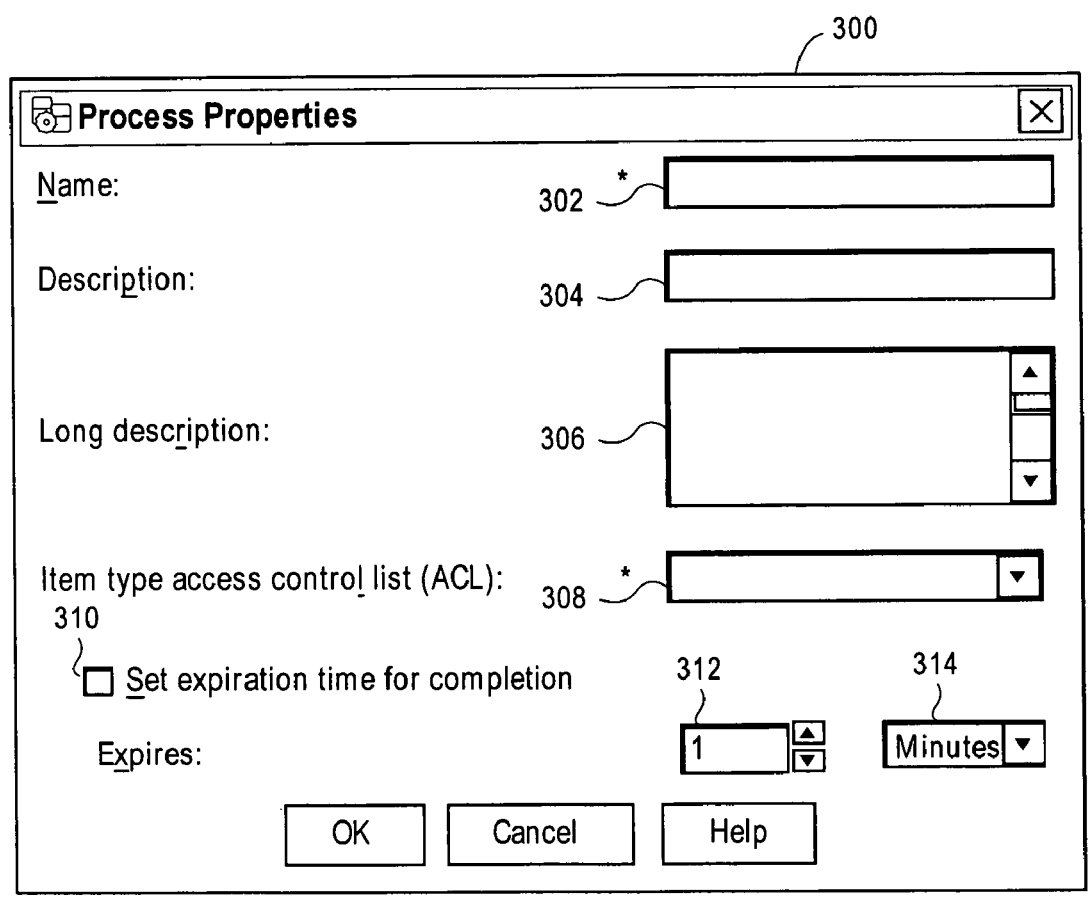
FIG. 3 is an exemplary process properties dialog box used in the creation of a new process in connection with a graphical workflow builder consistent with the present teachings.
Figure 4:
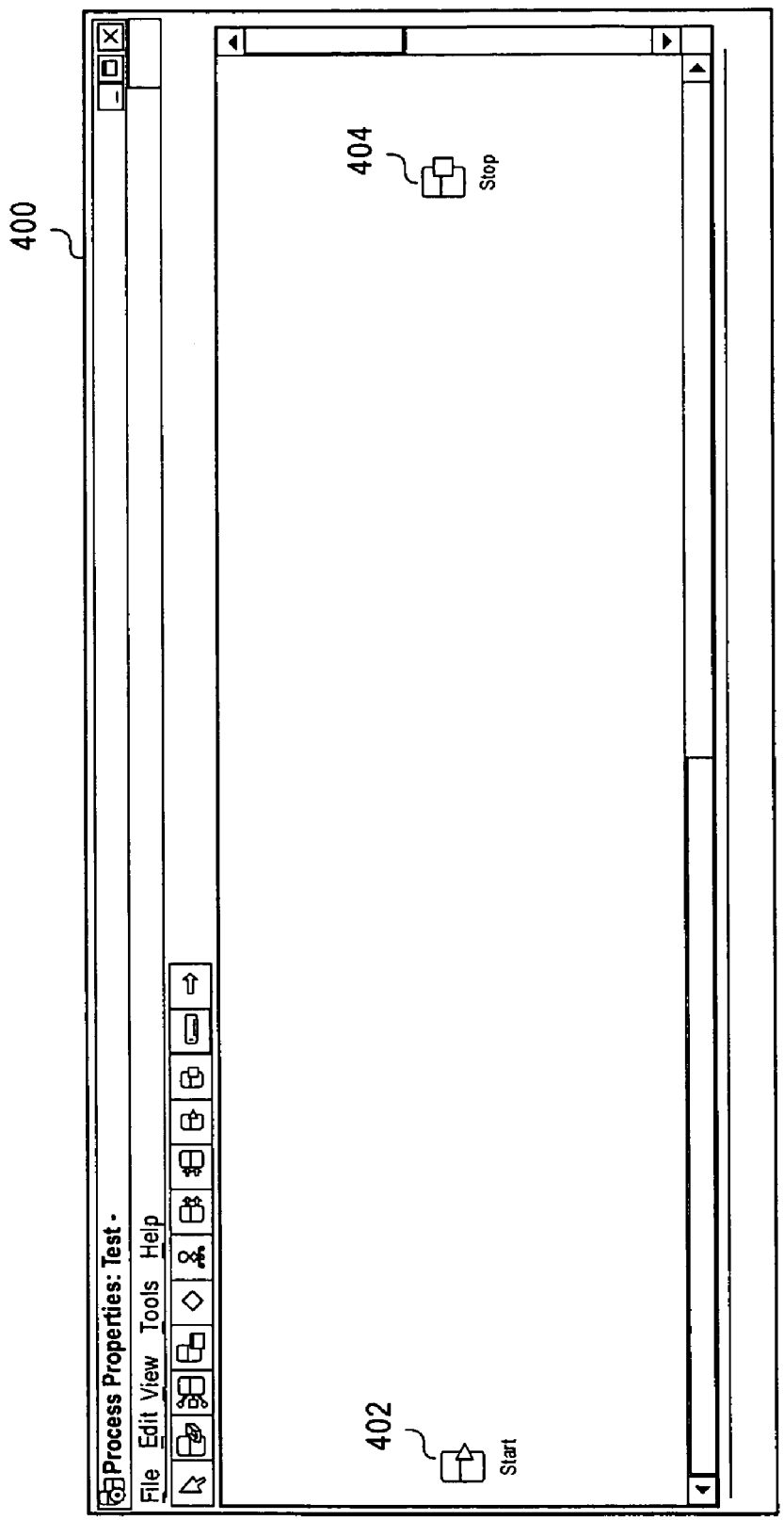
FIG. 4 is an exemplary blank process properties window that results from the creation of a new workflow process and represents an initialized canvas of the content aware workflow builder.

Referring now to FIGS. 3 and 4, dialog box 300 is an exemplary process properties dialog box used in the creation of a new process in connection with a graphical workflow builder consistent with the present teachings. In various embodiments, from window 200 of FIG. 2, a user creates a new process such as the claim process 500 of FIG. 5A using a process properties dialog box such as process properties dialog box 300 of FIG. 3. Within dialog box 300 is contained a name textbox 302 for providing a name of the process. Further is provided a description text box 304 for providing a brief description of the process. Additionally, a long description text area 306 is provided that permits input of a longer textual description of the process being created. Further access control lists can be provided in drop down menu 308. Within a particular workflow process, a user of the workflow builder tool can specify whether an expiration time for completion of the process will exist by checking check box 310. If an expiration time is provided for, it can be specified in connection with input controls 312 and 314. In various embodiments, conventional OK and Cancel dialog box buttons are provided as well. Window 400 of FIG. 4 illustrates a blank process window that is created by providing input to the dialog box 300 and selecting the OK button. Start and stop nodes 402 and 404, respectively, are also shown.

Figure 5A:
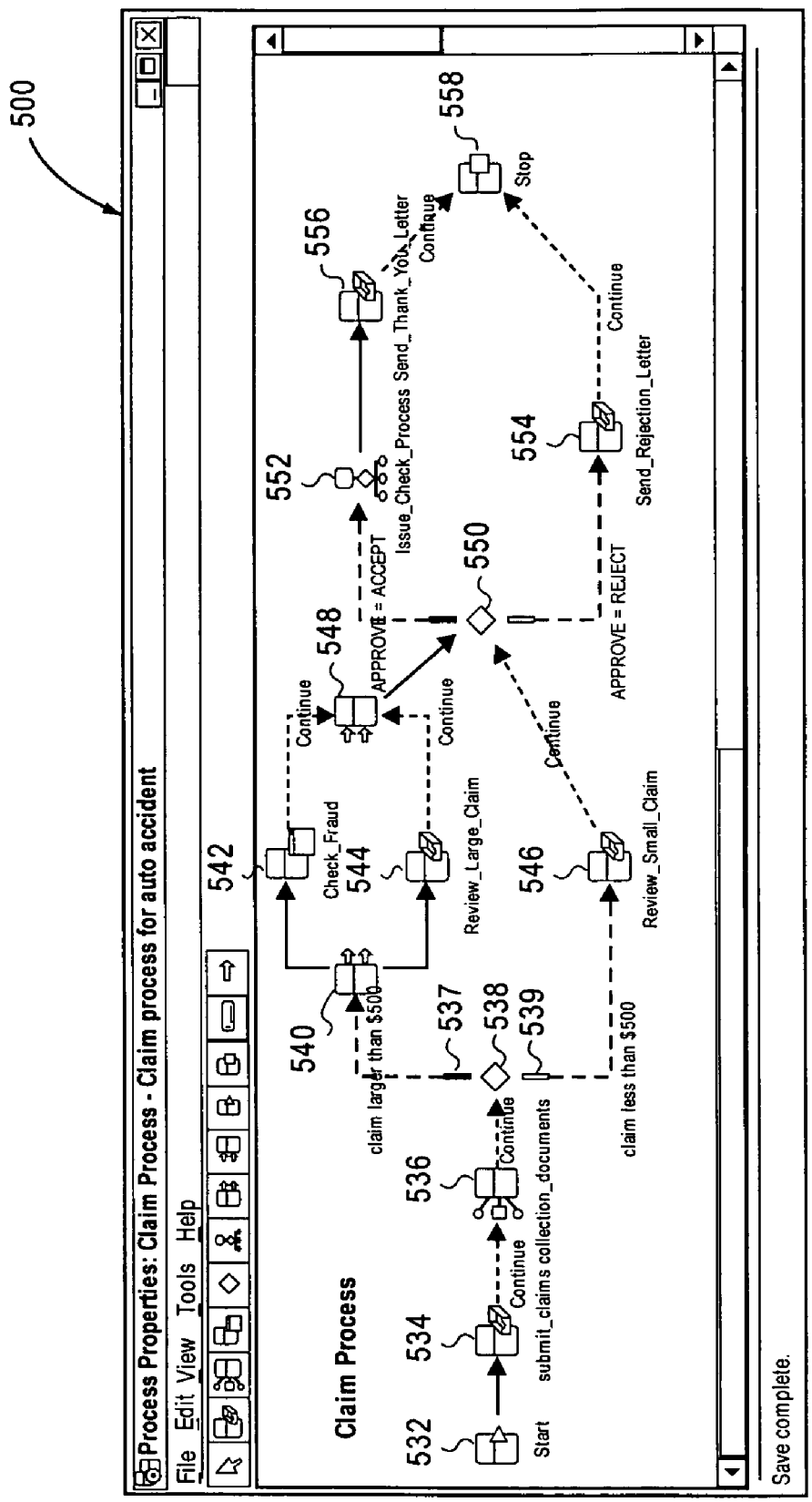
FIG. 5A is a block diagram illustrating a process properties window describing an exemplary insurance claim process for an automobile accident.
Figure 5B:
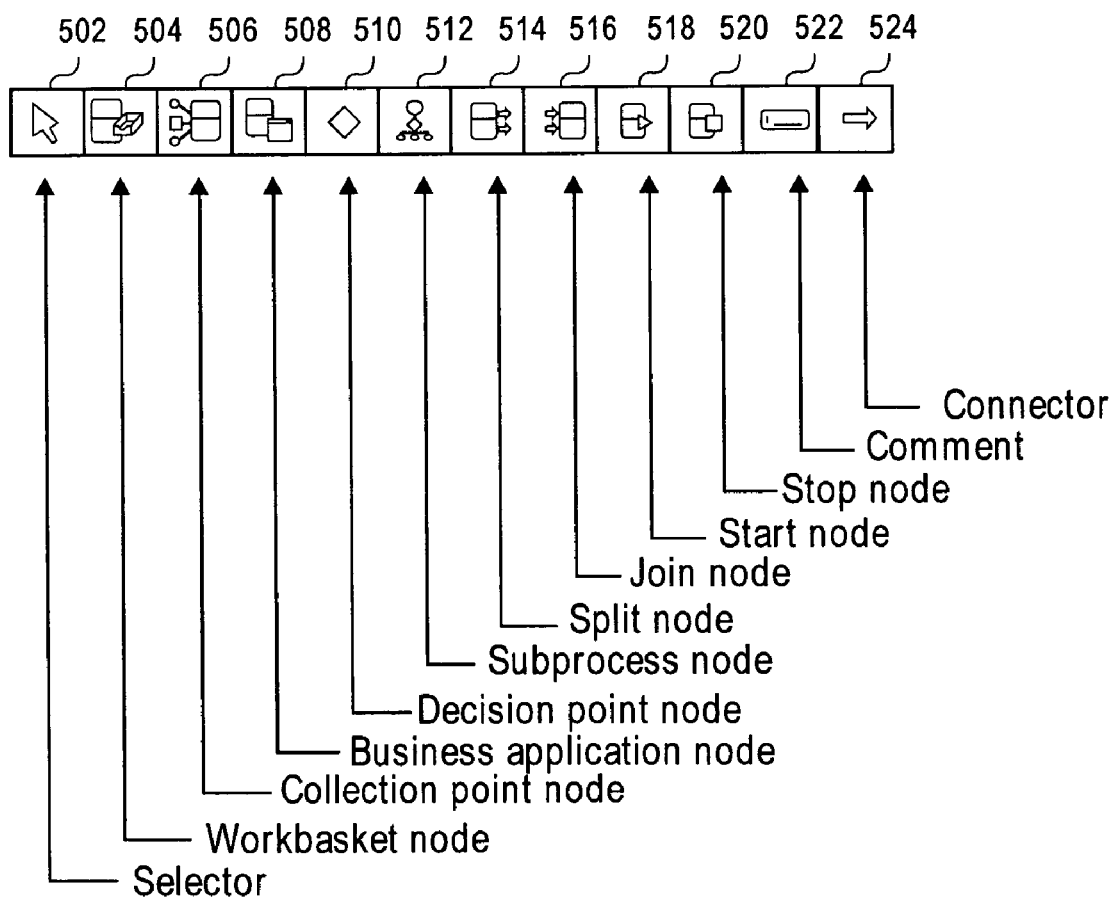
FIG. 5B is a diagram illustrating exemplary graphical buttons for use in connection with graphical workflow builders consistent with the present teachings.

In starting with the blank window 400, a process can be built by inserting nodes, such as the nodes shown in FIG. 5B, which is a diagram illustrating exemplary graphical buttons for use in connection with graphical workflow builders consistent with the present teachings. Specifically, selector 502 is used to select and move nodes within the workflow builder. Workbasket node 504 is used within a workflow process to represent an workbasket node. Collection point node 506 is used to collect specified documents. Business application node 508 is a node for providing an external user application by way of a user exit. Decision point node 510 is a step in the workflow that contains the decision criteria to determine the next route for a document in the process. Subprocess node 512 permits the use of subprocesses in connection with the workflow builders consistent with the present teachings. The use of subprocesses permits greater flexability, readability, and reusability in the workflow process diagrams. Split node 514 is used to implement parallel routing of documents. Join node 516 is used to bring parallel routing paths back together. In various embodiments, start node 518 is the entry point for a process, and stop node 520 represents a termination point for the process after which other processes are executed or continued or the workflow is identified as being completed. A comment node 522 can be employed to add annotations to the workflow process to, for example, explain why the workflow process was built as it was. Connector 524 can be used to link one node to another node within a workflow process.

FIG. 5A is a block diagram illustrating a process properties window describing an exemplary insurance claim process for an automobile accident. The workflow begins at start node 532. Graphical workflow programming objects representing modes have been inserted into process window 500. In various embodiments, the start node 532 of the process is the primary entry point into the process, such as the claim process contained in the process window 500. Next, the submit claims workbasket node 534 is provided at which point claims documents are gathered. Collection point node 536 specifies information regarding the documents that are to be collected via the workbasket node of 534. Next, the process proceeds to a decision point 538, which, in various embodiments, routes documents via branch connector 537 or branch connector 539 based on criteria associated with the branch connectors 537 and 539. Using the decision point 538, based upon the amount of the claim, the claims documents will be routed on two separate paths. If the claim is smaller than $500, it will proceed to the review small claims workbasket 546, continuing on to decision point for approving or rejecting the claim. Alternatively, if the claim is for more than $500 it proceeds to the split node 540 to permit parallel processing of the documents being routed. The parallel steps include a business application 542 to investigate possible check fraud, and a work basket 544 to review the large claim. Next the parallel paths are joined back together at join node 548, and the documents are sequentially routed to decision point 550, which determines whether a claim is approved or rejected. If the claim is rejected, a rejection letter is sent at workbasket node 554, and the process proceeds to completion at stop node 558. Alternatively, if the claim is approved, a subprocess 552 is executed for cutting a check. Next at workbasket node 556, a thank you letter is produced, and the process proceeds to completion at stop node 558.

Figure 6:
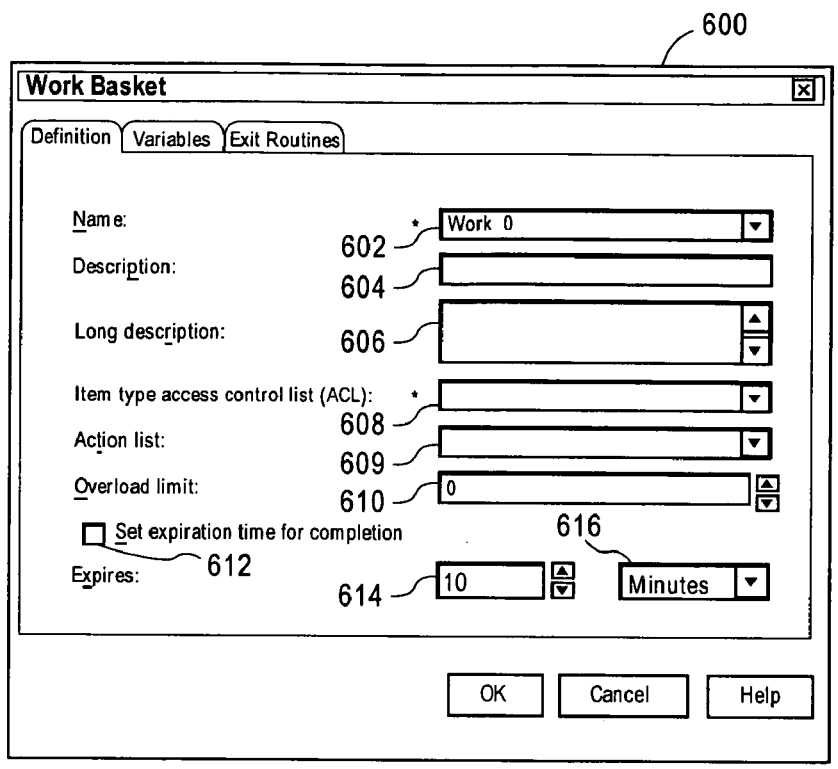
FIG. 6 is an exemplary dialog box illustrating a "Definition" tab of a workbasket node properties dialog box consistent with the present teachings.

FIG. 6 is an exemplary dialog box illustrating a "Definition" tab of a work basket properties dialog box 600 consistent with the present teachings. The definition portion of a work basket includes information regarding a step in the process at which point certain actions are performed. The definition section includes a name text box 602, which is used to provide a name for the work basket node. Description text box 604 and long description text area 606 are provided to permit a user to provide a description of the work basket node. Access control list menu 608 is provided so that user access to the work basket node can be controlled. Action list box 609 can be used by the administrator to specify a list of actions to be taken in connection with the work basket node. An overload limit input 610 is also provided, for example, to permit a user exit to take place if too many instances of the work basket node occur at a particular time in the document routing system. Overload can occur when, for example when an overload limit (e.g., 100) is specified for a workbasket node called (for example) "review." When the 100th document arrives at this "review" workbasket node, the overload user exit will be invoked, allowing for example for documents to be routed to workbasket nodes that are not overloaded or to generate an alarm that documents are not being processed fast enough at the "review" node. As with the process in general, a time for completion of the work basket can be provided with input controls 612, 614, and 616.

Figure 7:
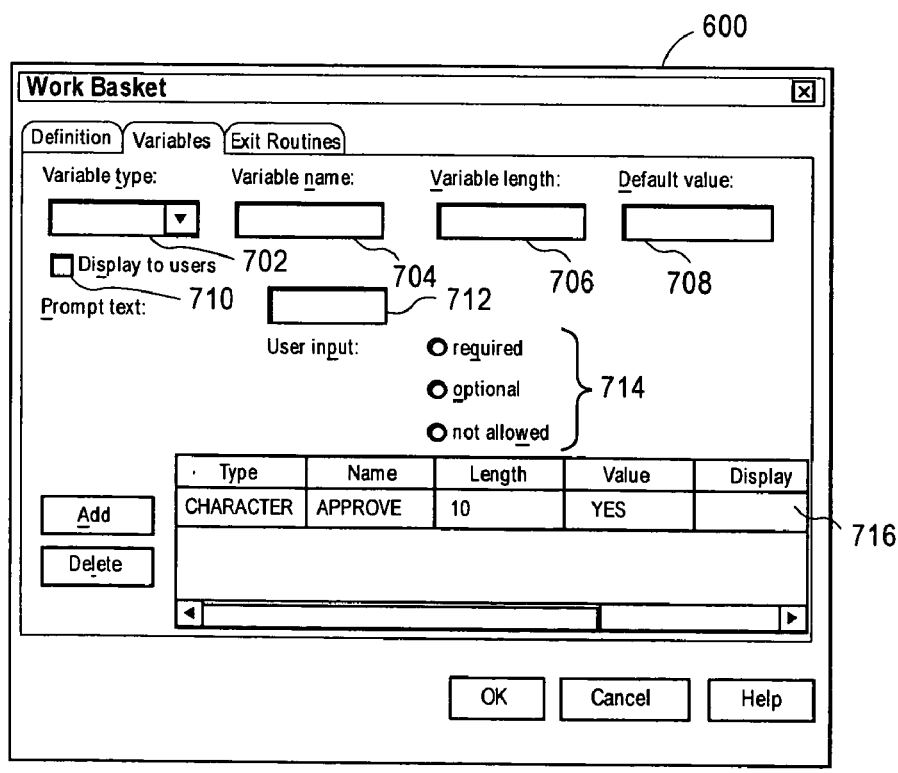
FIG. 7 is an exemplary dialog box illustrating a "Variables" tab of a workbasket node properties dialog box consistent with the present teachings.

FIG. 7 is an exemplary dialog box illustrating a "Variables" tab of a work basket properties dialog box consistent with the present teachings. Workers perform work on documents using a client application that, for example provides them with a list of documents that require processing. Workers and client applications themselves need not have information regarding an overall workflow process. Workers perform operations on groups of documents. In so doing, client applications can employ variables, such as a variable named "APPROVE" as illustrated in dialog box 700. Accordingly, variables can be considered like entries on a routing slip associated with a document. Using the variables dialog box of FIG. 7, administrators can define variables that are associated with particular work baskets. Input 702 allows an administrator to specify variable type, for example CHARACTER. Text boxes 704, 706, and 708 permit entry of a variable name, length, and default value. Via check box 710, an administrator can specify whether the variable is displayed to users and if so what the prompt text should be via text box 712. Radio buttons 714 permit an administrator to specify whether user input as to a particular variable is either required, optional, or not allowed. Window 716 is used to display a list of variables associated with a particular work basket node.

Figure 8:
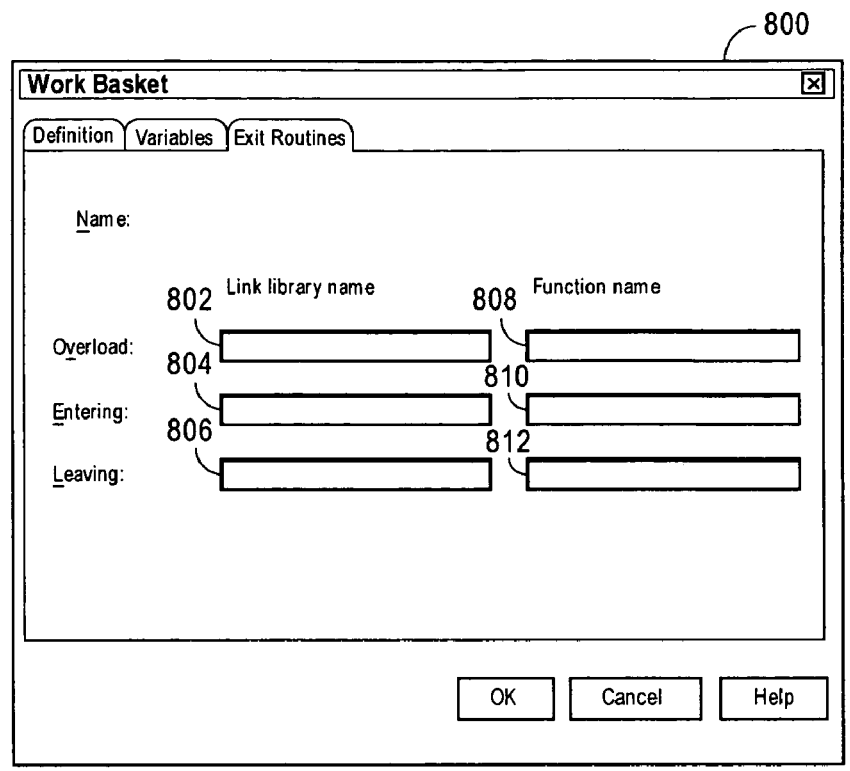
FIG. 8 is an exemplary dialog box illustrating an "Exit Routines" tab of a workbasket node properties dialog box consistent with the present teachings.

FIG. 8 is an exemplary dialog box illustrating an "Exit Routines" tab of a work basket properties dialog box consistent with the present teachings. User defined exit routines can also be provided in connection with work basket nodes so that function names can be specified to be executed upon the condition of overload, entering, and leaving of the work basket node respectively via text boxes 808, 810, and 812 respectively, from link libraries specified in text boxes 802, 804, and 806, respectively.

Figure 9:
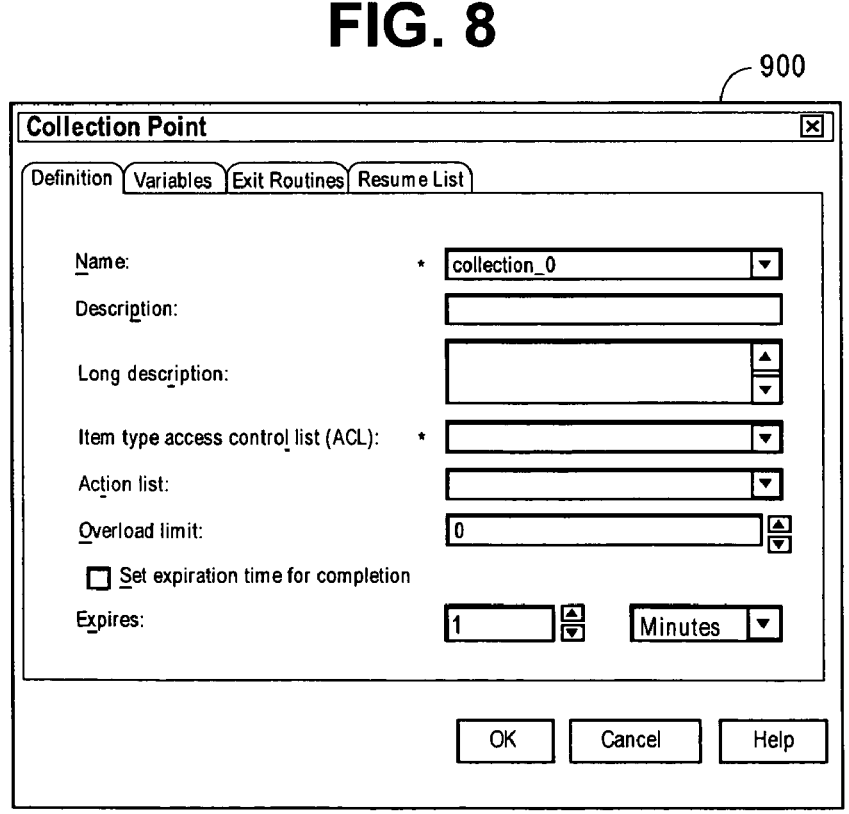
FIG. 9 is an exemplary dialog box illustrating a "Definition" tab of a collection point properties dialog box consistent with the present teachings.

FIG. 9 is an exemplary dialog box illustrating a "Definition" tab of a collection point properties dialog box consistent with the present teachings. Consistent with the present teachings, collection points are similar to work basket nodes with the exception that collection points can cause a process to wait for a certain number of documents of specified types contained in a folder of a specified type to be collected before proceeding. In various embodiments, documents of other types pass through the collection point as if it were not a part of the workflow process. The components of collection point dialog box 900 are analogous to those described in connection with FIG. 6. Similarly, collection points contain variables and exit routines tabs that are analogous to the exit routines tab of a work basket node as described in connection with FIGS. 7 and 8.

Figure 10:
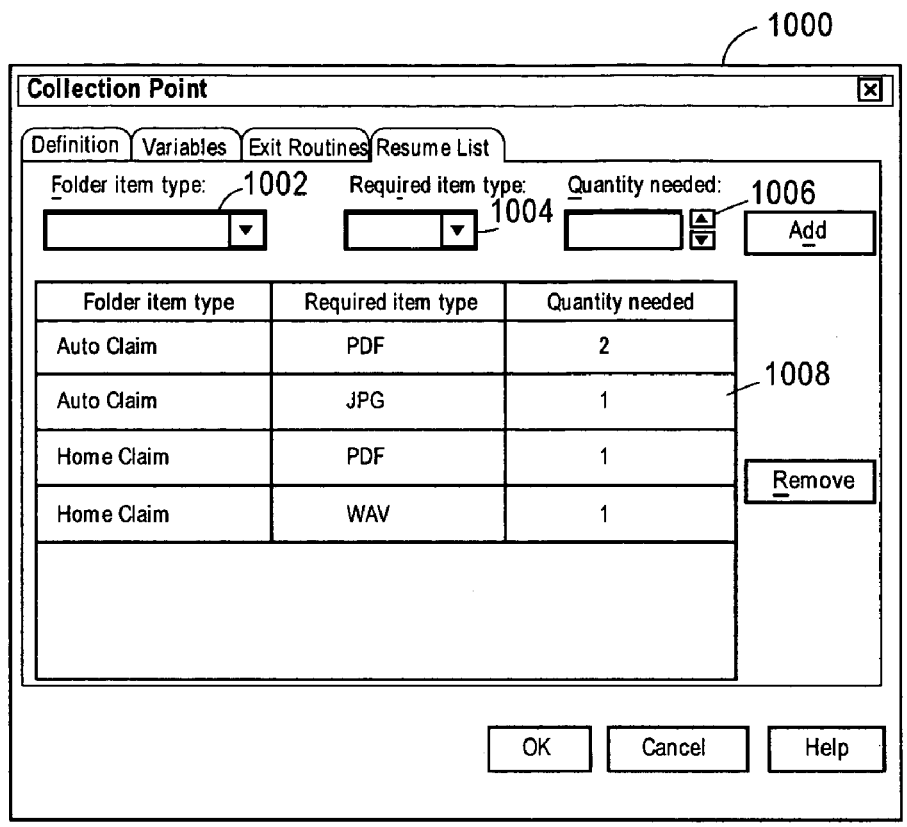
FIG. 10 is an exemplary dialog box illustrating a "Resume List" tab of a collection point properties dialog box consistent with the present teachings.

FIG. 10 is an exemplary dialog box illustrating a "Resume List" tab of a collection point properties dialog box 1000 consistent with the present teachings. The resume list tab allows an administrator to define what types of items (documents) are to be collected at that step in the workflow process. For example, a collection point in the exemplary clams processing workflow could wait for an automobile claim folder containing two PDF format items and one JPG format item before resuming. In the claim processing example, the PDFs could be a claim form and an estimate, for example, where the JPG could be a composite photograph of the accident or the damage to the automobile. In various embodiments, collection points can contain alternative resume criteria by way of alternative folder types. For example, as shown in dialog box 1000, auto claim folder item type and home claim folder types occur. In this example, resume occurs when the criteria for any one folder type occur. In this way, claims processing for multiple types of claims can be addressed in a single workflow. Inputs 1002, 1004, and 1006 of the dialog box 1000 permit an administrator to specify the set or sets of folder item types, required item types, and quantities needed to resume document flow. The set or sets of entries are displayed in window 1008.

Figure 11:
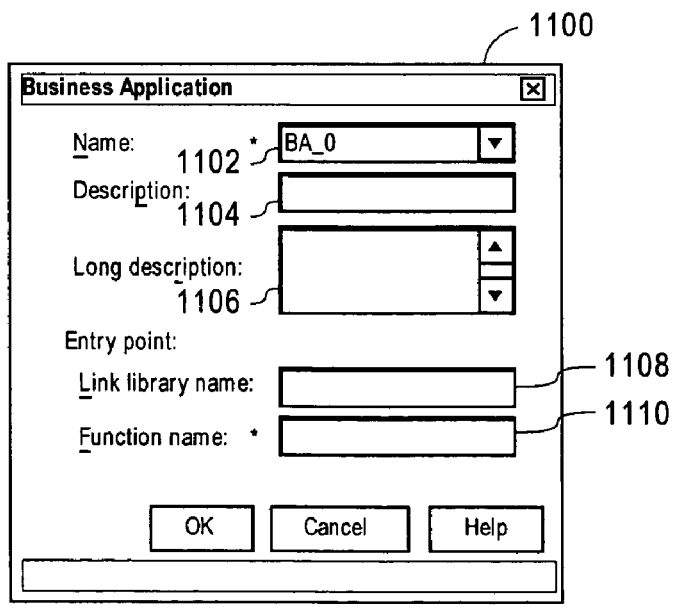
FIG. 11 is an exemplary dialog box illustrating a business application properties dialog box consistent with the present teachings.

FIG. 11 is an exemplary dialog box illustrating a business application properties dialog box consistent with the present teachings. Business application nodes are defined in connection with dialog box 1100 using inputs 1102, 1104, and 1106 respectively to specify a name and descriptions of the corresponding business application. The entry point into the business application can be specified using controls 1108 and 1110 to provide a link library name and a function name respectively.

Figure 12:
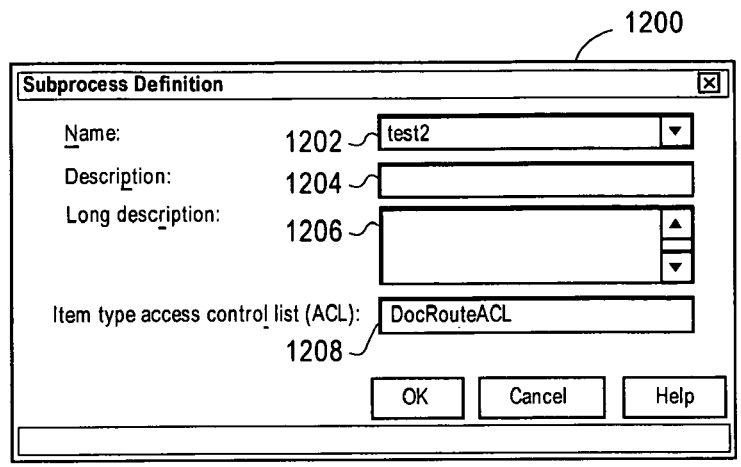
FIG. 12 is an exemplary dialog box illustrating a sub-process definition dialog box consistent with the present teachings.

FIG. 12 is an exemplary dialog box illustrating a subprocess definition dialog box consistent with the present teachings. Controls 1202, 1204, and 1206 of dialog box 1200 are used to specify a name and descriptions of the subprocess. Control 1208 is used to specify the ACL of the work node representing the subprocess.

Figure 13:
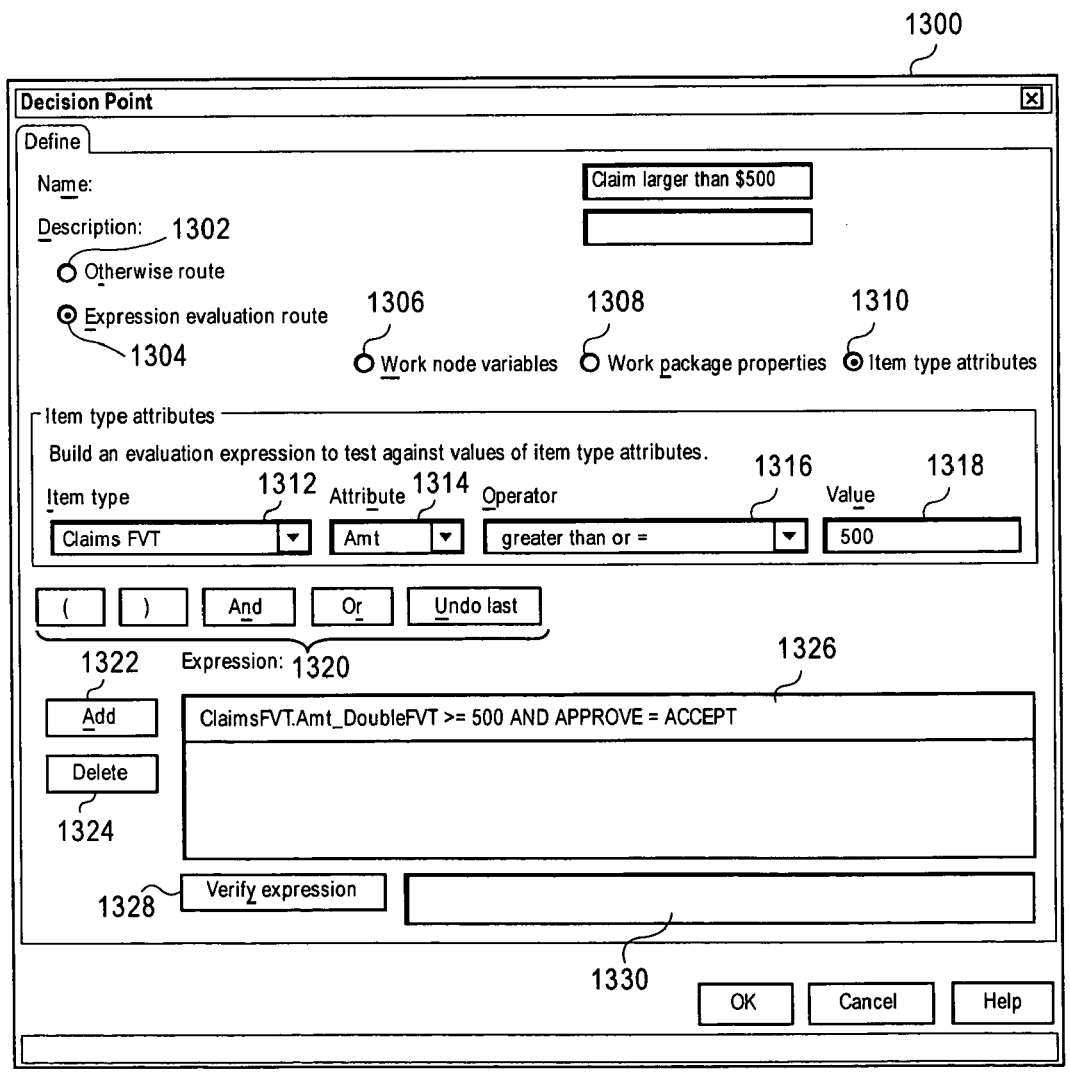
FIG. 13 is an exemplary dialog box illustrating a Decision point definition dialog box consistent with the present teachings.

FIG. 13 is an exemplary dialog box illustrating a decision point definition dialog box consistent with the present teachings. Decision point dialog box 1300 is used to specify the criteria for a content-aware decision point consistent with the present teachings. Radio buttons 1302 and 1304 are used to specify whether a particular criterion is based on an expression or an otherwise route. The dialog box 1300 represented in FIG. 13 is specifying an expression rather than an otherwise route. It is understood that, in various embodiments, when the otherwise route radio button 1302 is selected that the remaining portions of the dialog box are grayed out. A decision point dialog box such as dialog box 1300 is associated with each branch of a decision point, and in various embodiments, one of the routes of a decision point must be an "otherwise route" route, so that, in the case that an expression is not satisfied on one of the other routes, the workflow can continue along the "otherwise route" route.

Radio buttons 1306, 1308, and 1310 permit the administrator to select the type of attribute or variable to use in the construction of an expression using the remainder of the controls contained within exemplary dialog box 1300. For example, as shown in FIG. 13, the expression ClaimsFVT.Amt_DoubleFVT>=500 AND APPROVE=ACCEPT, meaning claims amount greater than or equals $500 and the claim is approved, can be constructed as shown. Namely, selecting an item type of ClaimsFVT and attribute Amt, using controls 1312 and 1314 respectively, the administrator selects an attribute for use in constructing an expression. It is understood that this layout results from radio button 1318 being selected. When radio buttons 1306 or 1308 are selected, expression construction controls would be provided corresponding to work node variables or work package properties, respectively. Using control 1316 an operator can be selected. It is understood that any set of operators can be provided without departing from the scope of the present teachings. In connection with control 1318, a comparison value for the expression can be selected. To build compound expressions, it is understood that parentheses and the logical AND and OR operators can be employed using the exemplary controls 1320. It is understood that any notation can be used for forming compound logical expressions without departing from the scope of the present teachings. Expressions can be added and deleted from the expression display window 1326 using add control 1322 and delete control 1324. In various embodiments, a specified expression can be verified in connection with control 1328, and the results of the verification are provided in text area 1330. In various embodiments, verification involves converting the expressions to underlying database queries, such as in the SQL language and evaluating the SQL statements for errors. In various embodiments, the text area 1330 displays a message regarding whether errors were encountered in the evaluation of the SQL statements.

Figure 14:
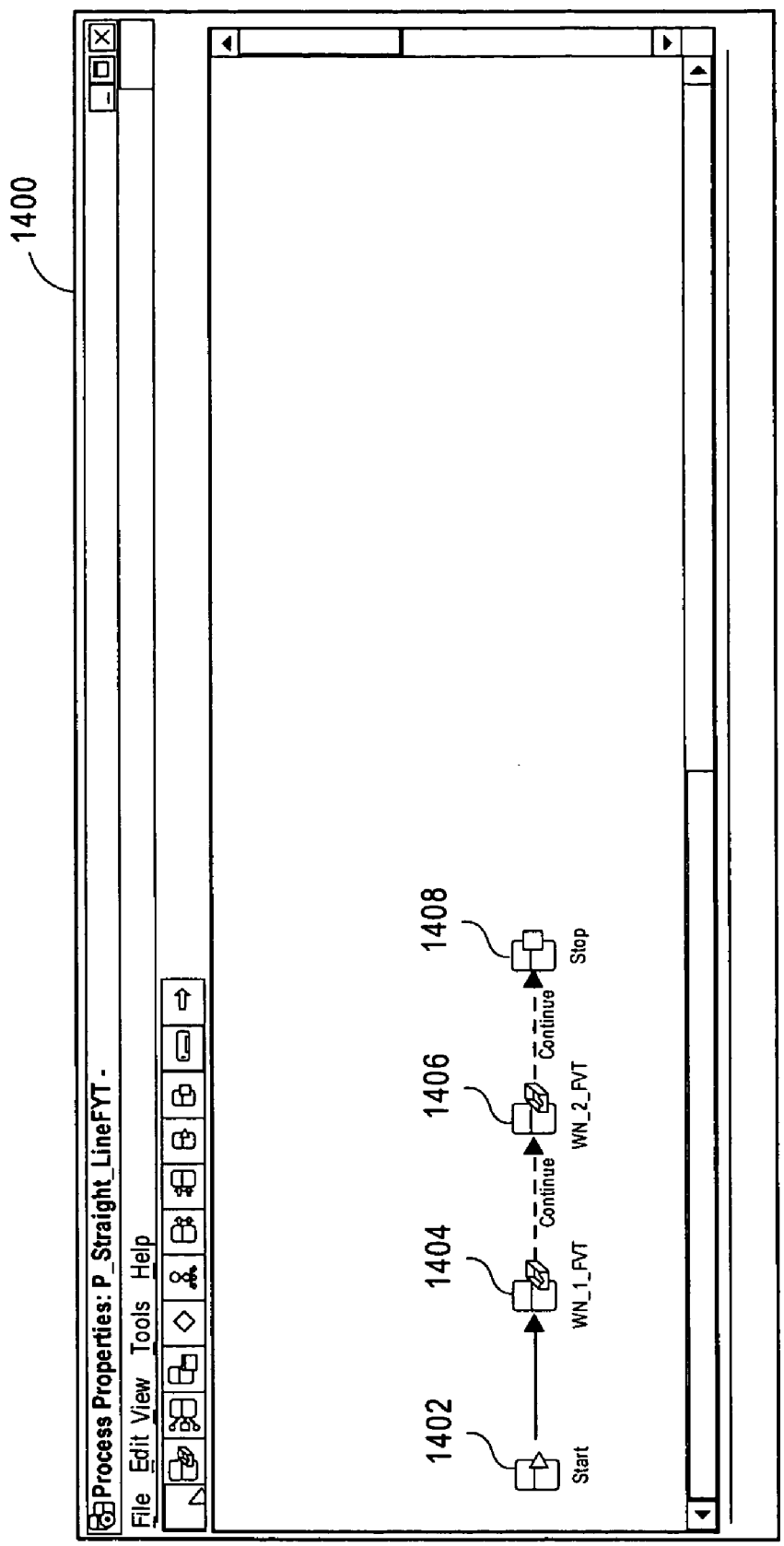
FIG. 14 is an exemplary simplified process properties window for the purposes of illustrating XML export operations in connection with the exemplary exported XML of FIGS. 15A-15C.

FIG. 14 is an exemplary simplified process properties window for the purposes of illustrating XML export operations in connection with the exemplary exported XML of FIGS. 15A-15C. The simplified process 1400 consists of a start node 1402, two work nodes, 1404 and 1406 and stop node 1408.

FIGS. 15A-15C illustrate an exemplary XML export corresponding to the simplified workflow model of FIG. 14. Documentation regarding the XML language used to specify workflow processes and an exemplary XML Schema Definition (XSD) is attached in the Appendix.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

APPENDIX

---------------------- XML Documenation ----------------------------------------------

```
<?xml version="1.0" standalone="yes" ?>    required constant
<process>
<processdata>
<name>PROCESSNAME</name>                   required PROCESSNAME   1 to 32 characters A-Z
<version>CM 8.3 xml</version>              required constant
<description>DESCRIPTION</description>     DESCRIPTION    1 to 254 characters A-Z
<documentation>DOCUMENTATION</documentation> DOCUMENTATION    1 to 2048 characters
A-Z
<aclname>ACLNAME</aclname>                 required ACLNAME defined in CM admin
and must exist
<processtimelimit>0</processtimelimit>     required max of 99999999
<stickyToolBar>OFF</stickyToolBar>              required ON or OFF
<autoLaunch>ON</autoLaunch>                     required ON or OFF
<showToolBarIcon>OFF</showToolBarIcon>     required ON or OFF
<showTable>OFF</showTable>                 required ALWAYS OFF
<showOverView>OFF</showOverView>           required ALWAYS OFF
<keyboardDrawMode>OFF</keyboardDrawMode>   required ON or OFF
<showIconText>OFF</showIconText>           required ON or OFF
<showTextState>ON</showTextState>          required ON or OFF
<iconSize>2</iconSize>                     required 1 or 2
</processdata>

<invoke>                                   This paragraph is constant and required
<name>Start</name>                         required constant
<description></description>                     not used on import to the workflow
builder
<documentation></documentation>            not used on import to the workflow builder
<type>Begin</type>                         required constant
<layoutxpos>21</layoutxpos>                     required represents X location on
drawing surface
<layoutypos>52</layoutypos>                     required represents Y location on
drawing surface
</invoke>

<invoke>                                   This paragraph is constant and required
<name>Stop</name>                          required constant
<description></description>                     not used on import to the workflow
builder
<documentation></documentation>            not used on import to the workflow builder
<type>Stop</type>                          required constant
<layoutxpos>889</layoutxpos>               required represents X location on drawing
surface
<layoutypos>267</layoutypos>               required represents Y location on drawing
surface
</invoke>
```

```
    <invoke>                                This paragraph represents a workbasket node
        <name>WORKBASKETNAME</name>             required WORKBASKETNAME defined in CM
admin and should exist
        <description>DESCRIPTION</description>    1 to 254 characters A-Z        overriden by
node in CM
        <documentation>DOCUMENTATION</documentation> 1 to 2048 characters A-Z overriden by
node in CM
        <type>Work</type>                       required constant
        <layoutxpos>40</layoutxpos>             required represents X location on
drawing surface
        <layoutypos>120</layoutypos>        required represents Y location on drawing
surface
    </invoke>

<invoke>                                This paragraph represents a collection node
        <name>COLLECTIONNAME</name>             required COLLECTIONNAME defined in CM
admin and should exist
        <description>DESCRIPTION</description>    1 to 254 characters A-Z        overriden by
node in CM
        <documentation>DOCUMENTATION</documentation> 1 to 2048 characters A-Z  overriden by
node in CM
        <type>Collection</type>                 required constant
        <layoutxpos>308</layoutxpos>        required represents X location on drawing
surface
        <layoutypos>121</layoutypos>        required represents Y location on drawing
surface
    </invoke>

<invoke>                                This paragraph represents a decision node (a
virtual node)
        <name>DECISIONNAME</name>           required DECISIONNAME defined in CM admin
and automatically re-created by the workflow builder
        <description></description>                 not used on import to the workflow
builder
        <documentation></documentation>     not used on import to the workflow builder
        <type>Decision</type>               required constant
        <layoutxpos>428</layoutxpos>        required represents X location on drawing
surface
        <layoutypos>123</layoutypos>        required represents Y location on drawing
surface
    </invoke>

<invoke>                                This paragraph represents a split node (a
virtual node)
        <name>SPLITNAME</name>              required SPLITNAME defined in CM admin and
automatically re-created by the workflow builder
        <description></description>                 not used on import to the workflow
builder
        <documentation></documentation>     not used on import to the workflow builder
        <type>Split</type>                  required constant
```

```
    <layoutxpos>527</layoutxpos>            required represents X location on drawing
surface
    <layoutypos>53</layoutypos>                 required represents Y location on
drawing surface
    </invoke>

<invoke>                                This paragraph represents a business
application node
    <name>BUSSINESSAPPNAME</name>           required BUSSINESSAPPNAME defined in CM
admin and should exist
    <description>DESCRIPTION</description>  1 to 254 characters A-Z       overriden
by node in CM
    <documentation>DOCUMENTATION</documentation> 1 to 2048 characters A-Z   overriden by
node in CM
    <type>UserExit</type>                   required constant
    <layoutxpos>620</layoutxpos>            required represents X location on drawing
surface
    <layoutypos>12</layoutypos>                 required represents Y location on
drawing surface
    <library>SHAREDLIBNAME</library>        required SHAREDLIBNAME 1 to 32 characters A-
Z
    <function>FUNCTIONNAME</function>       required FUNCTIONNAME  1 to 32 characters A-
Z
    </invoke>

<invoke>                                This paragraph represents a join node (a
virtual node)
    <name>JOINNAME</name>                   required JOINNAME defined in CM admin and
automatically re-created by the workflow builder
    <description></description>                 not used
    <documentation></documentation>         not used
    <type>Join</type>                       required constant
    <layoutxpos>721</layoutxpos>            required represents X location on drawing
surface
    <layoutypos>48</layoutypos>                 required represents Y location on
drawing surface
    </invoke>

<invoke>                                This paragraph represents a subprocess node
    <name>PROCESSNAME</name>                required PROCESSNAME defined in CM admin and
should exist
    <description>DESCRIPTION</description>  not used on import to the workflow builder
    <documentation>DOCUMENTATION</documentation> not used on import to the workflow
builder
    <type>Subprocess</type>                 required constant
    <layoutxpos>880</layoutxpos>            required represents X location on drawing
surface
    <layoutypos>169</layoutypos>            required represents Y location on drawing
surface
    </invoke>
```

```
    <invoke>                                    This paragraph represents a subprocess node
    <name>COMMENT</name>                        required COMMENT a string of characters that
represents a comment. No limit, but may not be practical beyond 254 characters
    <description></description>                         not used
    <documentation></documentation>             not used
    <type>Comment</type>                        required constant
    <layoutxpos>233</layoutxpos>                required represents X location on drawing
surface
    <layoutypos>206</layoutypos>                required represents Y location on drawing
surface
    </invoke>

<flow>                                      This paragraph represents a directional
connector <source>                                    source node tag
    <linkname>Start</linkname>                      required source node name of
connector and MUST exist for diagram to be valid <routename>10</routename>                   required route number that is consistent
from start to finish of a diagram in increments of 10
    <routetype>DIRECTIONAL</routetype>              required constant <lineoptions>
    <linecolor>java.awt.Color[r=0,g=0,b=0]</linecolor>  required constant in
java.awt.Color format
    <linewidth>2</linewidth>                    required width in pixes from 1 to a
reasonable max in pixel width
    <linesegment1>1.0</linesegment1>            required line segment length in pixes from 0
to a reasonable max in pixel length
    <linegap1>0.0</linegap1>                    required line segment gap in pixes from 0 to
a reasonable max in pixel gap
    <linesegment2>1.0</linesegment2>            required line segment length in pixes from 0
to a reasonable max in pixel length
    <linegap2>0.0</linegap2>                    required line segment gap in pixes from 0 to
a reasonable max in pixel gap
    </lineoptions>

<bendpoints>                                bend points for a line connector must be at
least 4 bendpoints defined.

<layoutxpos>10</layoutxpos>                     required represents location on
drawing surface and correlates to source and target nodes
    <layoutypos>10</layoutypos>                     required represents location on
drawing surface and correlates to source and target nodes <layoutxpos>20</layoutxpos>                     required represents location on
drawing surface and correlates to source and target nodes
    <layoutypos>25</layoutypos>                     required represents location on
drawing surface and correlates to source and target nodes
```

```
    <layoutxpos>52</layoutxpos>                    required represents location on
drawing surface and correlates to source and target nodes
    <layoutypos>64</layoutypos>                    required represents location on
drawing surface and correlates to source and target nodes <layoutxpos>62</layoutxpos>                    required represents location on
drawing surface and correlates to source and target nodes
    <layoutypos>78</layoutypos>                    required represents location on
drawing surface and correlates to source and target nodes </bendpoints>

</source>

<target>                                          target node tag
    <linkname>TARGETNODENAME</linkname>            required target node name of
connector and MUST exist for diagram to be valid
 </target>
</flow>

<flow>                                             This paragraph represents an options branch
connector <source>                                          source node tag
    <linkname>SOURCENODENAME</linkname>            required source node name of
connector and MUST exist for diagram to be valid <routename>10</routename>                     required route number that is consistent
from start to finish of a diagram in increments of 10
    <routetype>OPTIONS_BRANCH</routetype>         required constant
    <when>Continue</when>                         required at least a "Continue" string must
be specifed. If multiple branches exist from
                                                  a source node, the additional connections
must not be "Continue". Any string value is allowed.

<lineoptions>
      <linecolor>java.awt.Color[r=0,g=0,b=255]</linecolor>  required constant in
java.awt.Color format
      <linewidth>2</linewidth>                    required width in pixes from 1 to a
reasonable max in pixel width
      <linesegment1>5.0</linesegment1>            required line segment length in pixes from
0 to a reasonable max in pixel length
      <linegap1>1.0</linegap1>                    required line segment gap in pixes from 0
to a reasonable max in pixel gap
      <linesegment2>5.0</linesegment2>            required line segment length in pixes from
0 to a reasonable max in pixel length
      <linegap2>1.0</linegap2>                    required line segment gap in pixes from 0
to a reasonable max in pixel gap
    </lineoptions>
```

```
    <bendpoints>                              bend points for a line connector must be at
least 4 bendpoints defined.

<layoutxpos>10</layoutxpos>                  required represents location on
drawing surface and correlates to source and target nodes
        <layoutypos>10</layoutypos>                  required represents location on
drawing surface and correlates to source and target nodes <layoutxpos>24</layoutxpos>                  required represents location on
drawing surface and correlates to source and target nodes
        <layoutypos>10</layoutypos>                  required represents location on
drawing surface and correlates to source and target nodes <layoutxpos>152</layoutxpos>                 required represents location on
drawing surface and correlates to source and target nodes
        <layoutypos>11</layoutypos>                  required represents location on
drawing surface and correlates to source and target nodes <layoutxpos>166</layoutxpos>                 required represents location on
drawing surface and correlates to source and target nodes
        <layoutypos>11</layoutypos>                  required represents location on
drawing surface and correlates to source and target nodes </bendpoints>

</source>

<target>                                    target node tag
    <linkname>TARGETNODENAME</linkname>       required target node name of
connector and MUST exist for diagram to be valid
  </target>
</flow>

<flow>                                        This paragraph represents a decision point
criteria connector <source>                                    source node tag
    <linkname>DECISIONNODENAME</linkname>     required source node name of connector and
MUST exist for diagram to be valid
    <routename>30</routename>                 required route number that is consistent
from start to finish of a diagram in increments of 10
    <routetype>DECISION_POINT</routetype>     required constant <name>CONNECTORNAME</name>                CONNECTORNAME name that labels the
connector
    <description></description>               not used
    <when><![CDATA[Priority < 4444]]></when>  condition must be specified as CDATA.
Variable must exist in CM database worknodes. Boolean operators
                                              may be only those appropriate to the
variable and documented in the workflow builder documentation.
```

```
    <otherwise>no</otherwise>                YES or no. Must be no when branch criteria
is defined in when tags
    <precedence>1</precedence>                    precedence order in which the branch
is evaluated for the decision node
                                              must be contigous number with other branches
from this decision node and
                                              must be 1 or higher for branches that are
not the otherwise branch.

internal representation of the SQL generated
by the workflow builder
    <internalsql><![CDATA[SELECT 1  FROM ICMUT00204001 WP  WHERE ( WP.PRIORITY<4444 ) AND
WP.COMPONENTID=?]]></internalsql> external representation of the SQL generated
by the workflow builder
    <externalsql><![CDATA[SELECT 1  FROM ICMUT00204001 WP  WHERE ( WP.PRIORITY<4444 ) AND
WP.COMPONENTID=?]]></externalsql>

<decisiontext><![CDATA[Priority < 4444]]></decisiontext> decision text displayed for
the connector <lineoptions>
    <linecolor>java.awt.Color[r=255,g=0,b=0]</linecolor>  required constant in
java.awt.Color format
    <linewidth>2</linewidth>                  required width in pixes from 1 to a
reasonable max in pixel width
    <linesegment1>25.0</linesegment1>         required line segment length in pixes from
0 to a reasonable max in pixel length
    <linegap1>1.0</linegap1>                  required line segment gap in pixes from 0
to a reasonable max in pixel gap
    <linesegment2>25.0</linesegment2>         required line segment length in pixes from
0 to a reasonable max in pixel length
    <linegap2>1.0</linegap2>                  required line segment gap in pixes from 0
to a reasonable max in pixel gap
    </lineoptions>

<bendpoints>                              bend points for a line connector must be at
least 4 bendpoints defined.

<layoutxpos>10</layoutxpos>                   required represents location on
drawing surface and correlates to source and target nodes
    <layoutypos>10</layoutypos>                   required represents location on
drawing surface and correlates to source and target nodes <layoutxpos>19</layoutxpos>                   required represents location on
drawing surface and correlates to source and target nodes
    <layoutypos>25</layoutypos>                   required represents location on
drawing surface and correlates to source and target nodes
```

```
    <layoutxpos>79</layoutxpos>                     required represents location on
drawing surface and correlates to source and target nodes
    <layoutypos>116</layoutypos>                    required represents location on
drawing surface and correlates to source and target nodes <layoutxpos>88</layoutxpos>                     required represents location on
drawing surface and correlates to source and target nodes
    <layoutypos>130</layoutypos>                    required represents location on
drawing surface and correlates to source and target nodes </bendpoints>

</source>

<target>                                         target node tag
    <linkname>TARGETNODENAME</linkname>             required target node name of
connector and MUST exist for diagram to be valid
   </target>
  </flow>

<flow>
   <source>                                         This paragraph represents a decision point
otherwise connector
                                                    at least 1 and only 1 otherwise connector is
allowed.

<linkname>SOURCNODENAME</linkname>              required source node name of
connector and MUST exist for diagram to be valid
    <routename>40</routename>                       required route number that is consistent
from start to finish of a diagram in increments of 10
    <routetype>DECISION_POINT</routetype>           required constant <name>CONNECTORNAME</name>                      CONNECTORNAME name that labels the
connector
    <description></description>                     not used
    <otherwise>yes</otherwise>                      otherwise tag required for the
otherwise connection and must be set to yes
    <precedence>0</precedence>                      precedence is 0 for otherwise branch <internalsql><![CDATA[]]></internalsql>    not used for the otherwise connection
    <externalsql><![CDATA[]]></externalsql>    not used for the otherwise connection
    <decisiontext><![CDATA[]]></decisiontext>       not used for the otherwise connection <lineoptions>
     <linecolor>java.awt.Color[r=255,g=0,b=0]</linecolor>  required constant in
java.awt.Color format
     <linewidth>2</linewidth>                       required width in pixes from 1 to a
reasonable max in pixel width
     <linesegment1>25.0</linesegment1>              required line segment length in pixes from
0 to a reasonable max in pixel length
```

```
   <linegap1>1.0</linegap1>                    required line segment gap in pixes from 0
to a reasonable max in pixel gap
   <linesegment2>25.0</linesegment2>           required line segment length in pixes from
0 to a reasonable max in pixel length
   <linegap2>1.0</linegap2>                    required line segment gap in pixes from 0
to a reasonable max in pixel gap
   </lineoptions>

<bendpoints>                                bend points for a line connector must be at
least 4 bendpoints defined.

<layoutxpos>10</layoutxpos>                 required represents location on
drawing surface and correlates to source and target nodes
   <layoutypos>80</layoutypos>                 required represents location on
drawing surface and correlates to source and target nodes <layoutxpos>24</layoutxpos>                 required represents location on
drawing surface and correlates to source and target nodes
   <layoutypos>70</layoutypos>                 required represents location on
drawing surface and correlates to source and target nodes <layoutxpos>86</layoutxpos>                 required represents location on
drawing surface and correlates to source and target nodes
   <layoutypos>20</layoutypos>                 required represents location on
drawing surface and correlates to source and target nodes <layoutxpos>100</layoutxpos>                required represents location on
drawing surface and correlates to source and target nodes
   <layoutypos>10</layoutypos>                 required represents location on
drawing surface and correlates to source and target nodes </bendpoints>

</source>

<target>                                    target node tag
     <linkname>TARGETNODENAME</linkname>       required target node name of
connector and MUST exist for diagram to be valid
   </target>
  </flow>

</process>
```

---------------------------------- XSD ----------------------------------

```xml
<?xml version="1.0" encoding="UTF-8"?>
<xsd:schema xmlns:xsd="http://www.w3.org/2001/XMLSchema">
    <xsd:element name="aclname" type="xsd:string"/>
    <xsd:element name="autoLaunch" type="xsd:string"/>
    <xsd:element name="bendpoints">
        <xsd:complexType>
            <xsd:sequence maxOccurs="unbounded" minOccurs="1">
                <xsd:element ref="layoutxpos"/>
                <xsd:element ref="layoutypos"/>
                <xsd:element ref="layoutxpos"/>
                <xsd:element ref="layoutypos"/>
            </xsd:sequence>
        </xsd:complexType>
    </xsd:element>
    <xsd:element name="decisiontext" type="xsd:string"/>
    <xsd:element name="description" type="xsd:string"/>
    <xsd:element name="documentation">
        <xsd:complexType/>
    </xsd:element>
    <xsd:element name="externalsql" type="xsd:string"/>
    <xsd:element name="flow">
        <xsd:complexType>
            <xsd:sequence>
                <xsd:element ref="source"/>
                <xsd:element ref="target"/>
            </xsd:sequence>
        </xsd:complexType>
    </xsd:element>
    <xsd:element name="function" type="xsd:string"/>
    <xsd:element name="iconSize" type="xsd:string"/>
    <xsd:element name="internalsql" type="xsd:string"/>
    <xsd:element name="invoke">
        <xsd:complexType>
            <xsd:sequence>
                <xsd:element ref="name"/>
                <xsd:element ref="description"/>
                <xsd:element ref="documentation"/>
                <xsd:element ref="type"/>
                <xsd:element ref="layoutxpos"/>
                <xsd:element ref="layoutypos"/>
                <xsd:sequence maxOccurs="1" minOccurs="0">
                    <xsd:element ref="library"/>
                    <xsd:element ref="function"/>
                </xsd:sequence>
            </xsd:sequence>
        </xsd:complexType>
    </xsd:element>
    <xsd:element name="keyboardDrawMode" type="xsd:string"/>
```

```
<xsd:element name="layoutxpos" type="xsd:string"/>
<xsd:element name="layoutypos" type="xsd:string"/>
<xsd:element name="library" type="xsd:string"/>
<xsd:element name="linecolor" type="xsd:string"/>
<xsd:element name="linegap1" type="xsd:string"/>
<xsd:element name="linegap2" type="xsd:string"/>
<xsd:element name="lineoptions">
    <xsd:complexType>
        <xsd:sequence>
            <xsd:element ref="linecolor"/>
            <xsd:element ref="linewidth"/>
            <xsd:element ref="linesegment1"/>
            <xsd:element ref="linegap1"/>
            <xsd:element ref="linesegment2"/>
            <xsd:element ref="linegap2"/>
        </xsd:sequence>
    </xsd:complexType>
</xsd:element>
<xsd:element name="linesegment1" type="xsd:string"/>
<xsd:element name="linesegment2" type="xsd:string"/>
<xsd:element name="linewidth" type="xsd:string"/>
<xsd:element name="linkname" type="xsd:string"/>
<xsd:element name="name" type="xsd:string"/>
<xsd:element name="otherwise" type="xsd:string"/>
<xsd:element name="precedence" type="xsd:string"/>
<xsd:element name="process">
    <xsd:complexType>
        <xsd:sequence>
            <xsd:element ref="processdata"/>
            <xsd:element maxOccurs="unbounded" minOccurs="1" ref="invoke"/>
            <xsd:element maxOccurs="unbounded" minOccurs="1" ref="flow"/>
        </xsd:sequence>
    </xsd:complexType>
</xsd:element>
<xsd:element name="processdata">
    <xsd:complexType>
        <xsd:sequence>
            <xsd:element ref="name"/>
            <xsd:element ref="version"/>
            <xsd:element ref="description"/>
            <xsd:element ref="documentation"/>
            <xsd:element ref="aclname"/>
            <xsd:element ref="processtimelimit"/>
            <xsd:element ref="stickyToolBar"/>
            <xsd:element ref="autoLaunch"/>
            <xsd:element ref="showToolBarIcon"/>
            <xsd:element ref="showTable"/>
            <xsd:element ref="showOverView"/>
            <xsd:element ref="keyboardDrawMode"/>
            <xsd:element ref="showIconText"/>
            <xsd:element ref="showTextState"/>
```

```
                <xsd:element ref="iconSize"/>
            </xsd:sequence>
        </xsd:complexType>
</xsd:element>
<xsd:element name="processtimelimit" type="xsd:string"/>
<xsd:element name="routename" type="xsd:string"/>
<xsd:element name="routetype" type="xsd:string"/>
<xsd:element name="showIconText" type="xsd:string"/>
<xsd:element name="showOverView" type="xsd:string"/>
<xsd:element name="showTable" type="xsd:string"/>
<xsd:element name="showTextState" type="xsd:string"/>
<xsd:element name="showToolBarIcon" type="xsd:string"/>

<xsd:element name="source">
    <xsd:complexType>
        <xsd:sequence>
            <xsd:element ref="linkname"/>
            <xsd:element ref="routename"/>
            <xsd:element ref="routetype"/>
            <xsd:choice maxOccurs="1" minOccurs="0">
                <xsd:sequence>
                    <xsd:element ref="name"/>
                    <xsd:element ref="description"/>
                    <xsd:element maxOccurs="1" minOccurs="0" ref="when"/>
                    <xsd:element ref="otherwise"/>
                    <xsd:element ref="precedence"/>
                    <xsd:element ref="internalsql"/>
                    <xsd:element ref="externalsql"/>
                    <xsd:element ref="decisiontext"/>
                </xsd:sequence>
                <xsd:element ref="when"/>
            </xsd:choice>
            <xsd:element ref="lineoptions"/>
            <xsd:element ref="bendpoints"/>
        </xsd:sequence>
    </xsd:complexType>
</xsd:element>
<xsd:element name="stickyToolBar" type="xsd:string"/>
<xsd:element name="target">
    <xsd:complexType>
        <xsd:sequence>
            <xsd:element ref="linkname"/>
        </xsd:sequence>
    </xsd:complexType>
</xsd:element>
<xsd:element name="type" type="xsd:string"/>
<xsd:element name="version" type="xsd:string"/>
<xsd:element name="when" type="xsd:string"/>
```

```
</xsd:schema>
```

What is claimed is:

1. A method for providing a graphical workflow programming environment for routing at least one folder, the method comprising:
   providing, with a computing device, a workflow design platform comprising a process canvas for receiving at least one first graphical workflow programming object and at least one second graphical workflow programming object; and
   providing, with a computing device, at least one first graphical representation of the at least one first graphical workflow programming object and at least one second graphical representation of the at least one second graphical workflow programming object, the graphical representation adapted to be selected via an input device of the computing device by an administrator of the graphical workflow programming environment and inserted into the process canvas,
   wherein the at least one graphical workflow programming object comprises at least one graphical collection point configured for halting the routing of the at least one folder until the at least one folder contains a predefined quantity of each of a plurality of types of documents, wherein for different types of folders, the collection point requires different quantities of different types of documents to resume routing of the at least one folder,
   wherein the at least one first graphical workflow programming object is configured to perform an action when an overload limit is reached, and
   where the at least one second graphical workflow programming object comprises a graphical decision point that is adapted to route the documents based on metadata describing certain characteristics of the documents,
   wherein the graphical decision point further comprises an evaluation expression builder, and wherein the evaluation expression builder is adapted to evaluate the syntax correctness of an expression,
   wherein the evaluation expression builder is further adapted to evaluate the expression based on at least one item attribute and at least one work package property.

2. The method of claim 1, further comprising at least one worknode variable and wherein the evaluation expression builder is further adapted to evaluate an expression based on metadata describing certain characteristics of the at least one document and the at least one worknode variable.

3. The method of claim 1, wherein the graphical decision point further comprises at least two branch connectors for routing the document along at least two possible branches based on the evaluated expression.

4. The method of claim 1, wherein the graphical decision point further comprises an otherwise branch and at least two branch connectors for routing the document, wherein a branching outcome is based on evaluation of the expression based on a precedence associated with the expression.

5. A computer program product comprising a combination of code segments stored in a physical computer-readable memory and executable by at least one processor in at least one of a document routing server and at least one client computer to route at least one folder having a folder type according to a workflow process specified in connection with a graphical workflow programming environment, the computer program product comprising: at least one code segment operable to provide a workflow design platform comprising a process canvas for receiving at least one first graphical workflow programming object and at least one second graphical workflow programming object; and
   at least one code segment operable to provide a at least one first graphical representation of the at least one first graphical workflow programming object and at least one second graphical representation of the at least one second graphical workflow programming object, the graphical representation adapted to be selected by an administrator of the graphical workflow programming environment and inserted into the process canvas,
   wherein the at least one first graphical workflow programming object comprises at least one graphical collection point configured for halting the routing of the at least one folder until the at least one folder contains a predefined quantity of each of a plurality of types of documents, wherein for different types of folders, the collection point requires different quantities of different types of documents to resume routing of the at least one folder,
   wherein the at least one first graphical workflow programming object is configured to perform an action when an overload limit is reached, and
   wherein the at least one second graphical decision point is adapted to route the documents based on metadata describing certain characteristics of the documents;
   wherein the at least one graphical decision point further comprises an evaluation expression builder, and wherein the evaluation expression builder is adapted to evaluate the syntax correctness of an expression,
   wherein the evaluation expression builder is further adapted to evaluate the expression based on at least one item attribute and at least one work package property.

6. The method of claim 1, wherein the predefined quantity of each of the plurality of types of documents is determined based on a folder type of the at least one folder.

* * * * *